US012744421B2

(12) United States Patent
Knesnik

(10) Patent No.: US 12,744,421 B2
(45) Date of Patent: Sep. 22, 2026

(54) VEHICLE MOTOR ROTOR SHAFT

(71) Applicant: GM Global Technology Operations LLC, Detroit, MI (US)

(72) Inventor: Andrew Knesnik, Milford, PA (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 257 days.

(21) Appl. No.: 18/433,785

(22) Filed: Feb. 6, 2024

(65) Prior Publication Data

US 2025/0253728 A1 Aug. 7, 2025

(51) Int. Cl.
*H02K 1/32* (2006.01)
*H02K 9/19* (2006.01)

(52) U.S. Cl.
CPC .................................... *H02K 1/32* (2013.01); *H02K 9/19* (2013.01)

(58) Field of Classification Search
CPC .................................. H02K 1/32; H02K 9/19
USPC ...................................................... 310/261.1
See application file for complete search history.

(56) References Cited

U.S. PATENT DOCUMENTS 8,747,078 B2 * 6/2014 Brown .................... F04D 13/10 417/313
10,745,970 B2 * 8/2020 Liu ......................... E21B 17/16
11,255,264 B2 * 2/2022 Kalevi Makela ....... F02C 7/141
2013/0039782 A1 * 2/2013 Brown .................. F04D 29/445 417/313
2019/0063317 A1 * 2/2019 Duong .................... F01D 25/20
2020/0036248 A1 * 1/2020 Krais ....................... H02K 1/30
2020/0063496 A1 * 2/2020 Liu ......................... E21B 7/064

FOREIGN PATENT DOCUMENTS

DE 102021200117 A1 6/2022
DE 102021200118 A1 6/2022
DE 102021200120 A1 6/2022
DE 102021200121 A1 6/2022
JP 2006067777 A * 3/2006

OTHER PUBLICATIONS

Translation of foreign document JP 2006067777 A (Year: 2006).*
German Application No. 10 2024 108 803.6 filed Mar. 27, 2024; German Office Action dated Jan. 24, 2025; 6 pages.

* cited by examiner

*Primary Examiner* — Alex W Mok
(74) *Attorney, Agent, or Firm* — CANTOR COLBURN LLP

(57) ABSTRACT

A rotor shaft for an electric motor assembly of a vehicle defines a rotational axis and a forward direction and a rearward direction along the rotational axis and includes a shaft body having an inner bore therethrough delimited by an inner surface of the shaft body, a first shaft passage extending radially outward from the inner surface of the shaft body, a second shaft passage positioned in the rearward direction of the first shaft passage and extending radially outward from the inner surface of the shaft body, a fluid source fluidly coupled to the inner bore to feed fluid to the inner bore, and a flow splitter disposed in the inner bore forming a first split flowpath and a second split flowpath. Flow of the fluid from the fluid source is split by the flow splitter between the first split flowpath and the second split flowpath.

20 Claims, 9 Drawing Sheets

VEHICLE MOTOR ROTOR SHAFT

INTRODUCTION

The subject disclosure relates to vehicles, and in particular to a motor rotor shaft for a vehicle.

A vehicle motor may generate heat during use. Accordingly, it is desirable to provide an effective cooling system for one or more components of the motor.

SUMMARY

In one exemplary embodiment, a rotor shaft for an electric motor assembly of a vehicle defines a rotational axis and a forward direction and a rearward direction along the rotational axis and comprises a shaft body having an inner bore therethrough delimited by an inner surface of the shaft body, a first shaft passage extending radially outward from the inner surface of the shaft body, and a second shaft passage positioned in the rearward direction of the first shaft passage and extending radially outward from the inner surface of the shaft body, a fluid source fluidly coupled to the inner bore to feed fluid to the inner bore, and a flow splitter disposed in the inner bore forming a first split flowpath and a second split flowpath. Flow of the fluid from the fluid source is split by the flow splitter between the first split flowpath and the second split flowpath. The fluid passing through the first split flowpath bypasses the first shaft passage and enters the second shaft passage. At least a portion of the fluid passing through the second split flowpath enters the first shaft passage.

In addition to one or more of the features described herein, the rotor shaft further comprises an additional first shaft passage and an additional second shaft passage. The flow splitter further forms a third split flowpath and fourth split flowpath. The fluid passing through the third split flowpath bypasses the first shaft passage and the additional first shaft passage and enters the additional second shaft passage. At least a portion of the fluid passing through the fourth split flowpath enters the additional first shaft passage.

In addition to one or more of the features described herein, the flow splitter comprises a plurality of fins that form the first split flowpath and the second split flowpath.

In addition to one or more of the features described herein, the fins are helical structures.

In addition to one or more of the features described herein, outer radial ends each of the fins abut the inner surface of the shaft body.

In addition to one or more of the features described herein, an inlet of the first shaft passage is disposed between forward and rearward ends of the flow splitter.

In addition to one or more of the features described herein, the flow splitter comprises a dam disposed on at least part of a perimeter of the inner bore. The dam is positioned at a rearward end of the flow splitter. An opening is formed on a radial inner side of the dam.

In addition to one or more of the features described herein, the second shaft passage is circumferentially offset from the first shaft passage.

In addition to one or more of the features described herein, the inner bore comprises an upstream portion and a downstream portion that is rearward of the upstream portion. A diameter of the inner bore is greater at the downstream portion than at the upstream portion. The flow splitter extends through both the upstream portion and the downstream portion.

In addition to one or more of the features described herein, the inner bore has a constant diameter. The flow splitter comprises a dam disposed on at least part of a perimeter of the inner bore. The dam is positioned at a forward end of the flow splitter. An opening is formed on a radial inner side of the dam.

In addition to one or more of the features described herein, the fluid source is a snoot tube.

In addition to one or more of the features described herein, a plug is disposed on a forward end of the shaft body around the fluid source.

In addition to one or more of the features described herein, a plug is disposed on a rearward end of the shaft body.

In another exemplary embodiment, a rotor assembly for an electric motor assembly of a vehicle defines a forward direction and a rearward direction and comprises a rotor core comprising a rotor body defining a first rotor core passage and a second rotor core passage positioned in the rearward direction of the first rotor core passage, a rotor shaft disposed at least partially within the rotor core and defining a rotational axis extending in the forward direction and rearward direction. The rotor shaft comprises a shaft body having an inner bore therethrough delimited by an inner surface of the shaft body, a first shaft passage extending radially outward from the inner surface of the shaft body, and the first shaft passage fluidly coupled to the first rotor core passage, a second shaft passage positioned in the rearward direction of the first shaft passage and extending radially outward from the inner surface of the shaft body, the second shaft passage fluidly coupled to the second rotor core passage, a fluid source fluidly coupled to the inner bore to feed fluid to the inner bore, and a flow splitter disposed in the inner bore forming a first split flowpath and a second split flowpath. Flow of the fluid from the fluid source is split by the flow splitter between the first split flowpath and the second split flowpath. The fluid passing through the first split flowpath bypasses the first shaft passage and enters the second shaft passage. At least a portion of the fluid passing through the second split flowpath enters the first shaft passage.

In addition to one or more of the features described herein, the rotor shaft further comprises an additional first shaft passage and an additional second shaft passage. The flow splitter further forms a third split flowpath and fourth split flowpath. The fluid passing through the third split flowpath bypasses the first shaft passage and the additional first shaft passage and enters the additional second shaft passage. At least a portion of the fluid passing through the fourth split flowpath enters the additional first shaft passage.

In addition to one or more of the features described herein, the flow splitter comprises a plurality of fins that form the first split flowpath and the second split flowpath.

In addition to one or more of the features described herein, an inlet of the first shaft passage is disposed between forward and rearward ends of the flow splitter.

In addition to one or more of the features described herein, the flow splitter comprises a dam disposed on at least part of a perimeter of the inner bore. The dam is positioned at a rearward end of the flow splitter. An opening is formed on a radial inner side of the dam.

In addition to one or more of the features described herein, the inner bore has a constant diameter. The flow splitter comprises a dam disposed on at least part of a perimeter of the inner bore. The dam is positioned at a forward end of the flow splitter. An opening is formed on a radial inner side of the dam.

In yet another exemplary embodiment, a vehicle comprises an electric motor assembly comprising a rotor assembly. The rotor assembly comprises a rotor core comprising a rotor body defining a first rotor core passage and a second rotor core passage positioned in a rearward direction of the first rotor core passage, and a rotor shaft disposed at least partially within the rotor core and defining a rotational axis extending in a forward direction and rearward direction. The rotor shaft comprises a shaft body having an inner bore therethrough delimited by an inner surface of the shaft body, a first shaft passage extending radially outward from the inner surface of the shaft body, and the first shaft passage fluidly coupled to the first rotor core passage, a second shaft passage positioned in the rearward direction of the first shaft passage and extending radially outward from the inner surface of the shaft body, the second shaft passage fluidly coupled to the second rotor core passage, a fluid source fluidly coupled to the inner bore to feed fluid to the inner bore, and a flow splitter disposed in the inner bore forming a first split flowpath and a second split flowpath. Flow of the fluid from the fluid source is split by the flow splitter between the first split flowpath and the second split flowpath. The fluid passing through the first split flowpath bypasses the first shaft passage and enters the second shaft passage. At least a portion of the fluid passing through the second split flowpath enters the first shaft passage.

The above features and advantages, and other features and advantages of the disclosure are readily apparent from the following detailed description when taken in connection with the accompanying drawings.

BRIEF DESCRIPTION OF THE DRAWINGS

Other features, advantages and details appear, by way of example only, in the following detailed description, the detailed description referring to the drawings in which.

DETAILED DESCRIPTION

Figure 1:
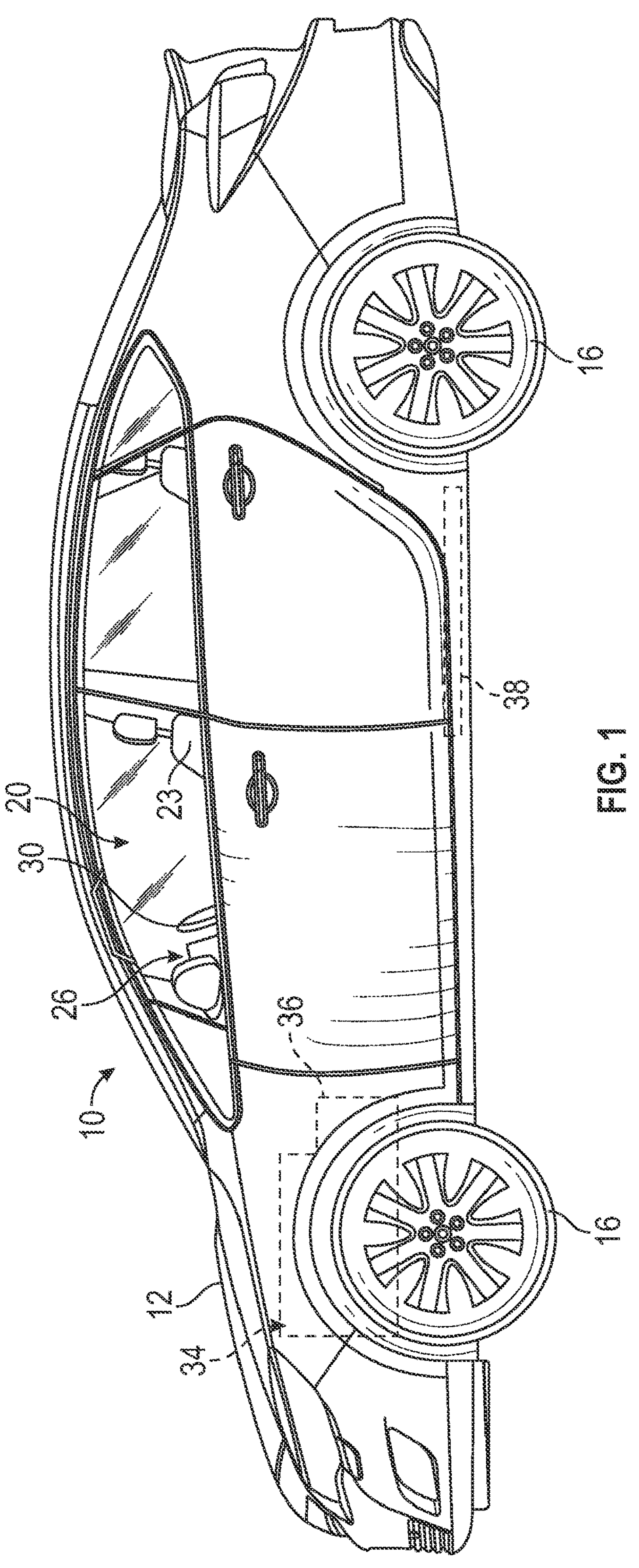
FIG. 1 is a left side view of a vehicle including an electric motor assembly according to one or more embodiments.

The following description is merely exemplary in nature and is not intended to limit the present disclosure, its application or uses. It should be understood that throughout the drawings, corresponding reference numerals indicate like or corresponding parts and features.

A vehicle 10 according to a non-limiting example is shown in FIG. 1. The vehicle 10 includes a body 12 supported on a plurality of wheels 16. One or more of the plurality of wheels 16 are steerable. The body 12 defines, in part, a passenger compartment 20 having seats 23 positioned behind a dashboard 26. A steering control 30 is arranged between seats 23 and a dashboard 26. The steering control 30 is operated to control orientation of the steerable wheel(s) 16.

The vehicle 10 includes an electric motor assembly 34 connected to a system of gears 36 that provides power to one or more of the plurality of wheels 16. A rechargeable energy storage system 38 is arranged in the body 12 and provides power to the electric motor assembly 34. While specific locations are shown for the electric motor assembly 34, the system of gears 36, and the rechargeable energy storage system 38 in FIG. 1, these locations are merely exemplary and not limiting, and locations of these structures may vary.

Figure 2:
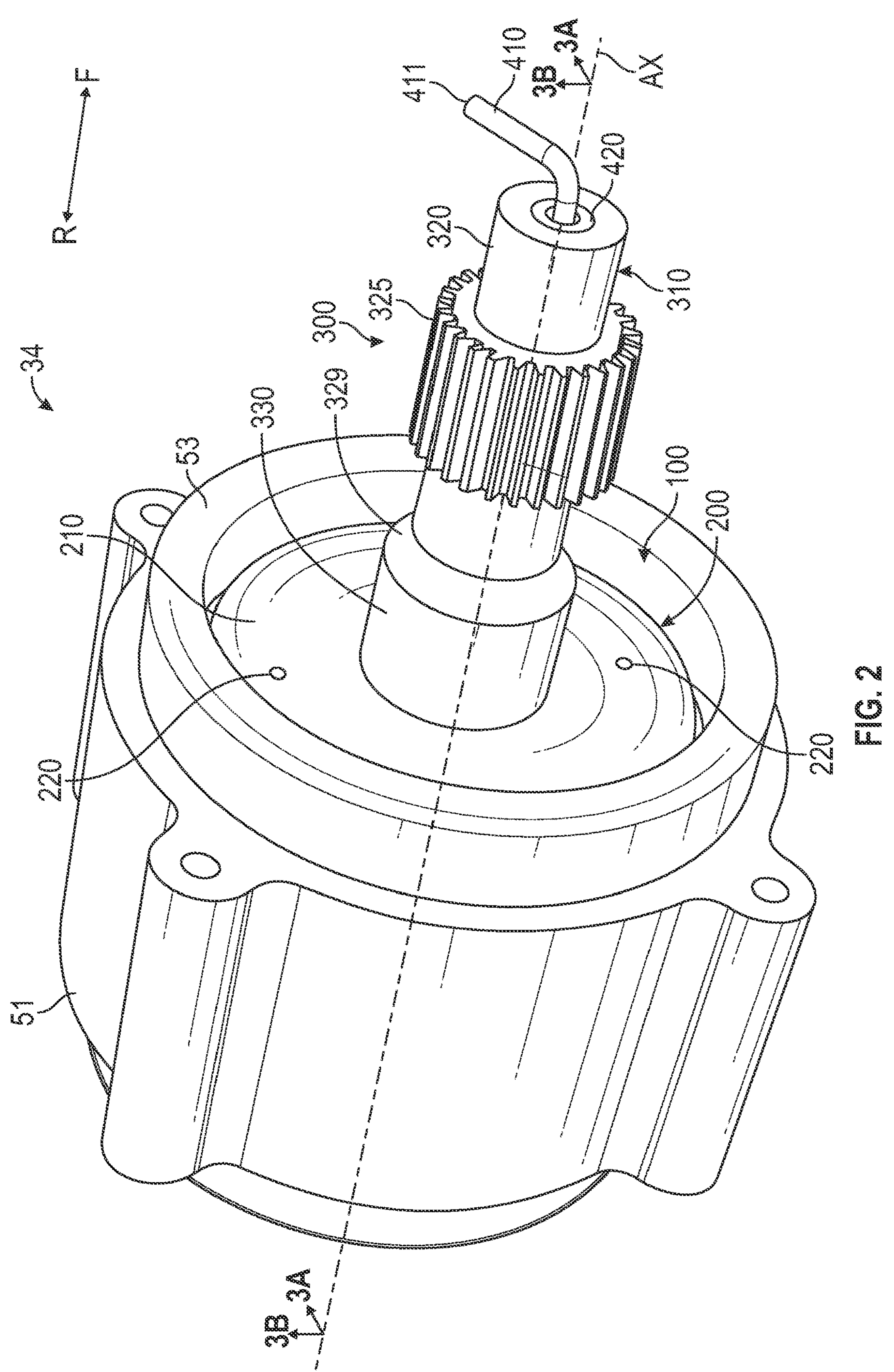
FIG. 2 is a perspective view of an electric motor assembly according to one or more embodiments.
Figure 3A:
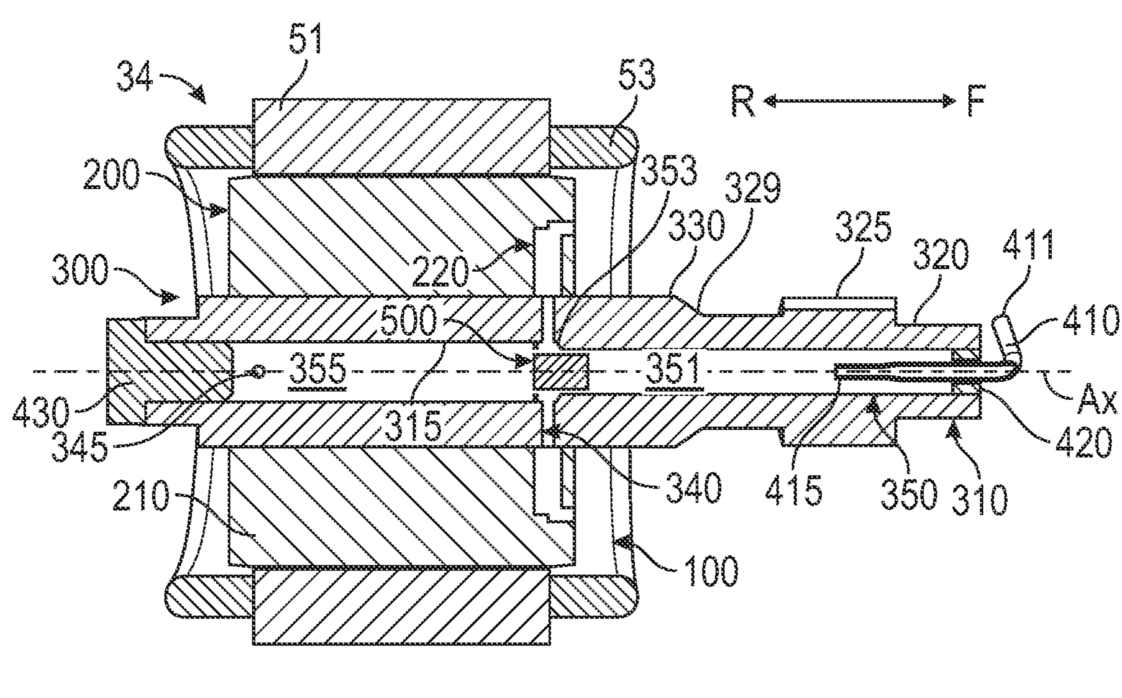
FIG. 3A is a cross-sectional view of the electric motor assembly taken at 3A-3A in FIG. 2.
Figure 3B:
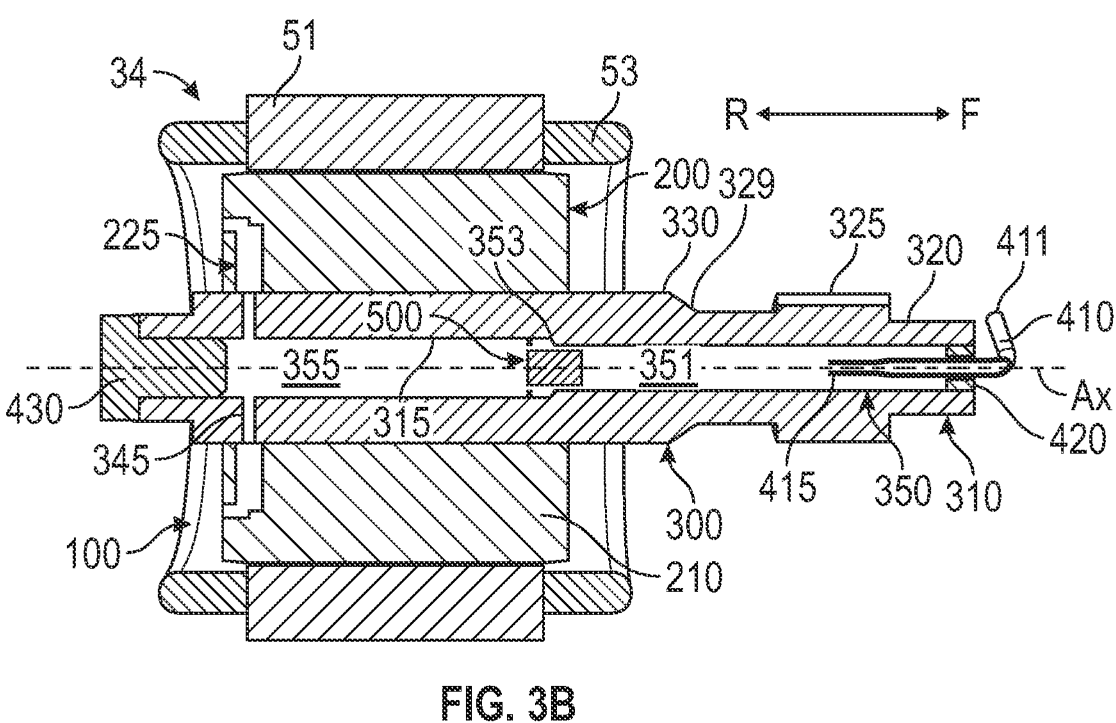
FIG. 3B is a cross-sectional view of the electric motor assembly taken at 3B-3B in FIG. 2.
Figure 5A:
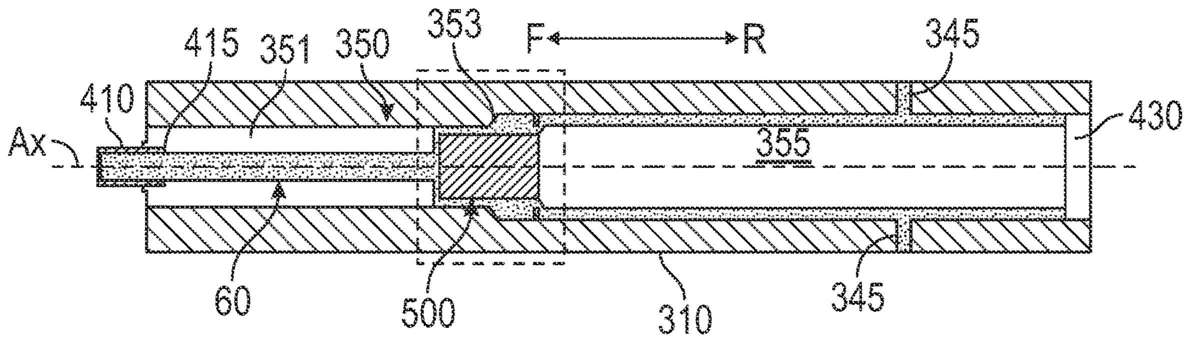
FIG. 5A is a cross-sectional view showing an example flowpath of fluid within the inner bore defined in a rotor shaft according to one or more embodiments.
Figure 5B:
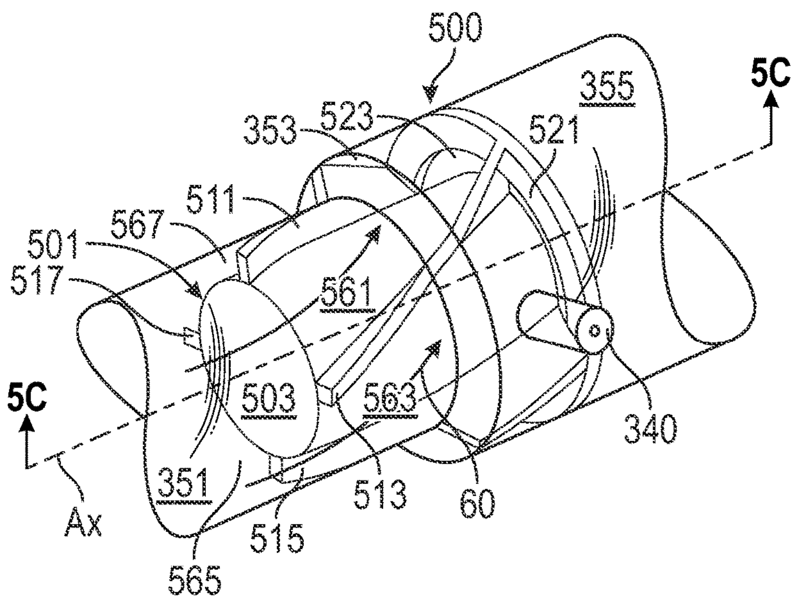
FIG. 5B is a perspective view showing the bracketed portion in FIG. 5A.
Figure 5C:
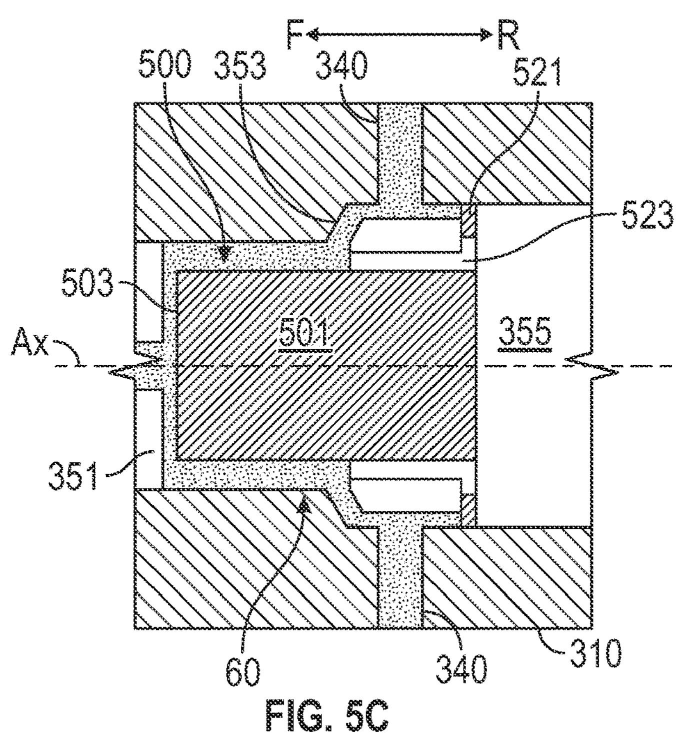
FIG. 5C is a cross-sectional view showing the bracketed portion in FIG. 5A rotated 90 degrees.

A perspective view of an electric motor assembly 34 according to a non-limiting example is shown in FIG. 2, a cross-sectional view of the electric motor assembly 34 taken at 3A-3A in FIG. 2 is shown in FIG. 3A, and a cross-sectional view of the electric motor assembly 34 taken at 3B-3B in FIG. 2 is shown in FIG. 3B. The electric motor assembly 34 includes a stator 51 and windings 53 that are annular structures defining a space therein. The stator 51 and the windings 53 may be fixed so as to be stationary. A rotor assembly 100 is disposed within the space defined by the stator 51 and the windings 53 such that the stator 51 and windings 53 surround at least a portion of the rotor assembly 100. The electric motor assembly 34 defines a rotation axis Ax about which the rotor assembly 100 rotates. A forward direction F and a rearward direction R, defined with respect to a flow direction of fluid 60 as shown in FIGS. 5A-5C, extend along the rotation axis Ax, and radial directions extend perpendicular to the rotation axis Ax.

The rotor assembly 100 includes a rotor core 200 and a rotor shaft 300. The rotor core 200 surrounds at least a portion of the rotor shaft 300, and the rotor core 200 is fixed to the rotor shaft 300 such that rotation of the rotor core 200 rotates the rotor shaft 300. A person of ordinary skill in the art would understand that the rotor core 200 may be rotated by supplying electricity to the windings 53, and the rotation is translated to the rotor shaft 300.

The rotor core 200 may include a rotor core body 210. The rotor core body 210 may define therein a plurality of first rotor core passages 220 extending from an inner surface of the rotor core body 210 to an axially forward surface of the rotor core body 210. Although two first rotor core passages 220 disposed radially opposite each other are shown, the present application is not limited thereto.

The rotor shaft 300 is an annular structure around an axis of rotation Ax. The rotor shaft 300 includes a shaft body 310. The shaft body 310 may include a first portion 320, a gear portion 325 around the first portion 320, a second portion 330, and a tapered portion 329 extending between the first portion 320 and the second portion 330. The second portion 330 may have a larger outer diameter than the first portion 320. The rotor core 200 may be disposed around the second portion 330. Alternatively, the shaft body 310 may have a constant outer diameter with no tapered portion. The gear portion 325 may mesh with a gear of another component within the vehicle 10 to transmit rotation thereto.

Figure 4A:
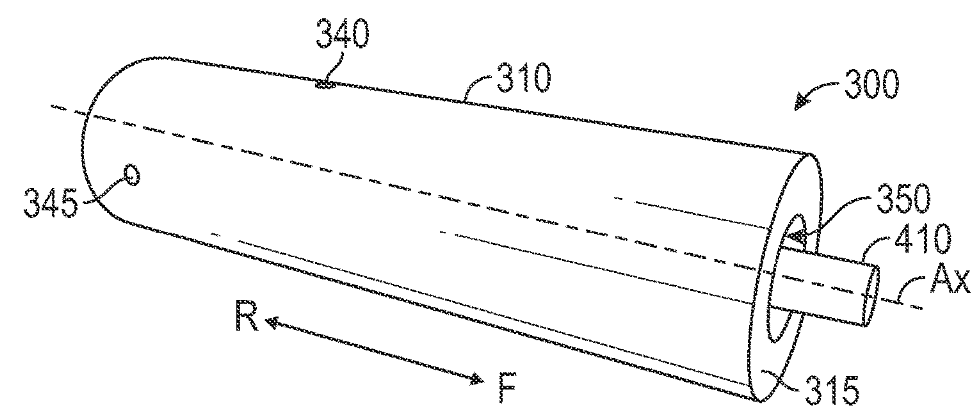
FIG. 4A is a perspective view of a rotor shaft according to one or more embodiments.
Figure 4B:
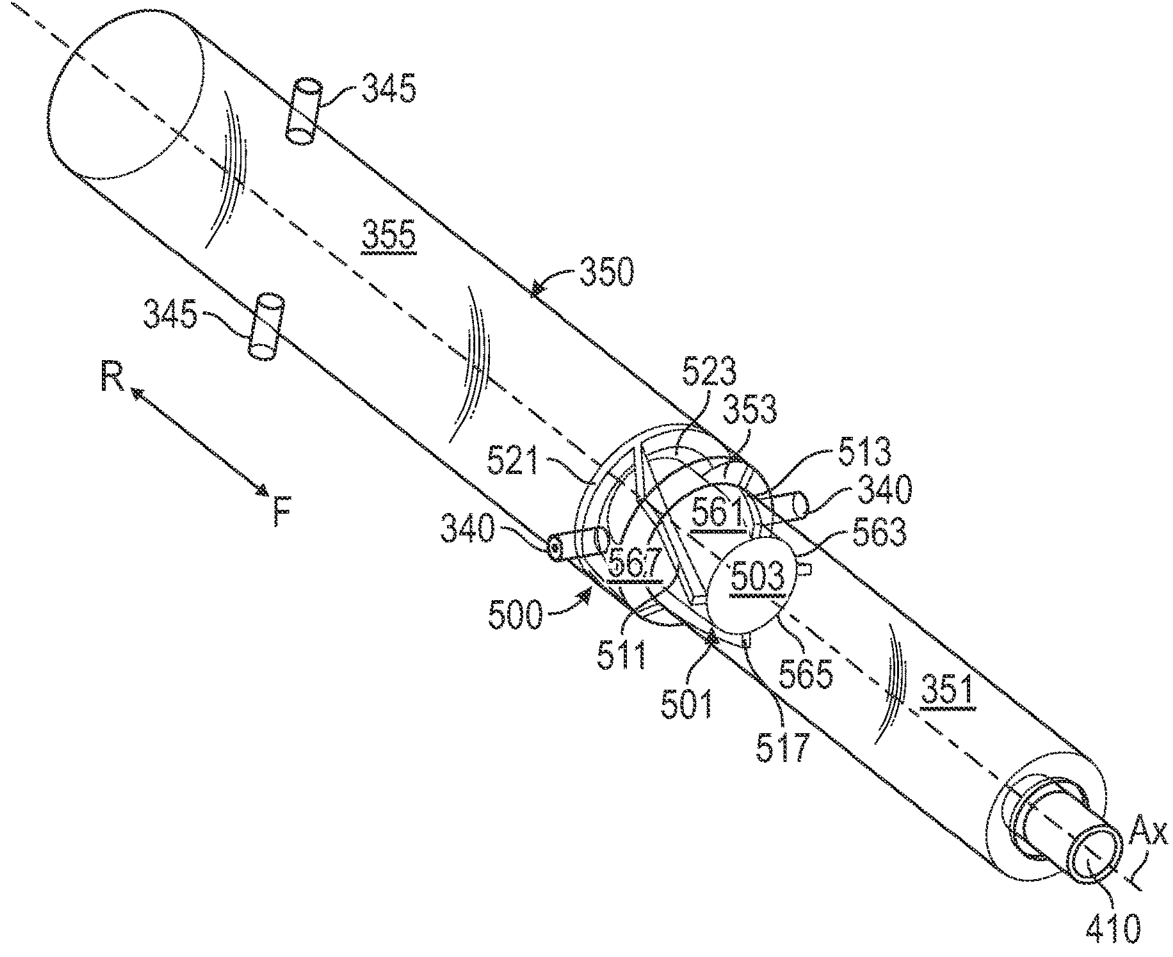
FIG. 4B is a perspective view of a snoot tube and a flow splitter within an inner bore defined in a rotor shaft according to one or more embodiments.

As the electric motor assembly 34 is operated, components of the electric motor assembly 34 such as the rotor core 200 and/or the rotor shaft 300 and/or the windings 53 may generate heat and/or heat may be transferred to the rotor core 200 and/or the rotor shaft 300. To remove heat from the rotor core 200 and/or the rotor shaft 300 and/or the windings 53, fluid 60 (see FIGS. 5A-5C) may be fed through the rotor core 200 and/or rotor shaft 300. To accommodate flow of the fluid 60 for cooling, the shaft body 310 defines an inner bore 350 therethrough, delineated by an inner surface 315 of the shaft body 310. The inner bore 350 may be formed by drilling through the shaft body 310. The axis of rotation Ax may pass through the inner bore 350. FIG. 4B shows an outline of the inner bore 350 with a flow splitter 500 and a snoot tube 410 disposed therein. The snoot tube 410 is an example of a fluid source.

According to one or more embodiments, the inner bore 350 may include an upstream portion 351 and a downstream portion 355. The downstream portion 355 may have a greater diameter than the upstream portion 351, and a diverging portion 353 may connect the upstream portion 351 and the downstream portion 355.

A plurality of first shaft passages 340 may extend radially through the shaft body 310. The first shaft passages 340 may formed by, for example, drilling through the shaft body 310. The first shaft passages 340 may be disposed at the downstream portion 355 of the inner bore 350. The first shaft passages 340 may be disposed immediately downstream of the diverging portion 353 of the inner bore 350. An inner end of each of the first shaft passages 340 are open to the inner bore 350, and an outer end of each of the first shaft passages 340 may be fluidly coupled to one of the first rotor core passages 220. The first shaft passages 340 and the first rotor core passages 220 coupled together may be referred to as first rotor passages. Fluid 60, which is shown in FIGS. 5A-5C and will be described in detail below with respect thereto, may flow into the first rotor passages from the inner bore 350 through an inner end of the first shaft passages 340, through the first shaft passages 340 and the first rotor core passages 220, and exit from an outlet formed at the forward surface of the rotor core body 210. The fluid 60 may then collect at a sump (not shown).

The flow splitter 500 is disposed within the inner bore 350. According to one or more embodiments, the flow splitter 500 may extend at least partially through both the upstream portion 351 and the downstream portion 355. The flow splitter 500 may be positioned such that inlets of the first shaft passages 340 are disposed radially outward of the flow splitter 500. As will be described in detail below, the flow splitter 500 may direct a portion of flow of fluid 60 towards the first shaft passages 340.

A plurality of second shaft passages 345 may extend radially through the shaft body 310. The second shaft passages 345 may formed by, for example, drilling through the shaft body 310. The second shaft passages 345 may be disposed at the downstream portion 355 of the inner bore 350, rearward of the first shaft passages 340. The second shaft passages 345 may be circumferentially offset from the first shaft passages 340. For example, the second shaft passages 345 may be circumferentially offset from first shaft passages 340 by 90 degrees. An inner end of each of the second shaft passages 345 are open to the inner bore 350, and an outer end of each of the second shaft passages 345 may be fluidly coupled to second rotor core passages 225 that extend to a rearward surface of the rotor core body 210. The second shaft passages 345 and the second rotor core passages 225 coupled together may be referred to as second rotor passages. Fluid 60, which is shown in FIGS. 5A-5C and will be described in detail below with respect thereto, may flow into the second rotor passages from the inner bore 350 through an inner end of the second shaft passages 345, through the second shaft passages 345 and the second rotor core passages 225, and exit from an outlet formed at the rearward surface of the rotor core body 210. The fluid 60 may then collect at a sump (not shown).

The snoot tube 410 is fluidly coupled to the inner bore 350. For example, the snoot tube 410 may be inserted into a forward end of the inner bore 350. At least a portion of the snoot tube 410 may extend into the inner bore 350 such that a snoot tube outlet 415 is disposed within the inner bore 350. At least a portion of the snoot tube 410 may extend outside of the inner bore 350 such that a snoot tube inlet 411 is disposed outside of the inner bore 350. An upstream plug 420 may be disposed at a forward end of the inner bore 350 around the snoot tube 410. The upstream plug 420 may block fluid 60 (see FIGS. 5A-5C) from escaping out of the forward end of the inner bore 350. A downstream plug 430 may be disposed at a rearward end of the inner bore 350. The downstream plug 430 may block fluid 60 (see FIGS. 5A-5C) from escaping out of the rearward end of the inner bore 350.

As shown in FIG. 4B, the flow splitter 500 may include a flow splitter body 501. The flow splitter body 501 may be, for example, a cylindrical structure. The flow splitter body 501 may include a leading edge surface 503 disposed on a forward end of the flow splitter body 501. A first fin 511, a second fin 513, a third fin 515, and a fourth fin 517 may end radially outward from the flow splitter body 501. Radial ends of each of the first, second, third, and fourth fins 511, 513, 515, 517 may abut against the inner surface 315 of the shaft body 310 to split the inner bore 350 into multiple flowpaths. For example, as shown in FIGS. 4B and 5B, the first and second fins 511, 513 may define a first split flowpath 561 therebetween, the second and third fins 513, 515 may define a second split flowpath 563 therebetween, the third and fourth fins 515, 517 may define a third split flowpath 565 therebetween, and the fourth and first fins 517, 511 may define a fourth split flowpath 567 therebetween. As shown in FIG. 4B, the first, second, third, and fourth fins 511, 513, 515, 517 may be helical, extending obliquely with respect to the rotation axis Ax. The helical structure of the first, second, third, and fourth fins 511, 513, 515, 517 may reduce momentum of fluid 60 passing therethrough. While four fins splitting the inner bore 350 into four split flowpaths are shown, the present application is not limited thereto. For example, the flow splitter 500 may include any number of fins defining split flowpaths, e.g., two fins defining two split flowpaths, three fins defining three split flowpaths, five fins defining five split flowpaths, etc.

According to one or more embodiments, inlets of the first shaft passages 340 may be disposed at the second split flowpath 563 between the second fin 513 and the third fin 515 and at the fourth split flowpath 567 between the fourth fin 517 and the first fin 511.

The flow splitter 500 may include a downstream dam 521 that is an annular structure formed at a rearward end of the flow splitter 500. The downstream dam 521 may abut the inner surface 315 of the shaft body 310. A downstream opening 523 may be defined between the downstream dam 521 and the flow splitter body 501. The first, second, third, and fourth fins 511, 513, 515, 517 may extend to the downstream dam 521 to separate the downstream opening 523 into four openings.

FIG. 5A shows an example flowpath of fluid 60 within the inner bore 350 defined by the shaft body 310 of the rotor shaft according to one or more embodiments. FIG. 5B is a perspective view showing the bracketed portion in FIG. 5A and FIG. 5C is a cross-sectional view showing the bracketed portion in FIG. 5A rotated 90 degrees. The fluid 60 may be, for example, automatic transmission fluid (ATF).

As shown in FIG. 5A, the snoot tube 410 may feed the fluid 60 into the inner bore 350 from the snoot tube outlet 415. The fluid 60 may exit the snoot tube outlet 415 with a relatively high flow velocity and momentum such that the fluid 60 impinges on the leading edge surface 503 of the flow splitter 500. As the shaft body 310 in which the inner bore 350 is defined is rotating about the rotation axis Ax during operation of the electric motor assembly 34, the fluid 60 impinging on the leading edge surface 503 is directed radially outward by centrifugal forces to flow around the flow splitter body 501. As shown in FIG. 5B, as the fluid 60 flows around the flow splitter body 501, the first fin 511, the second fin 513, the third fin 515, and the fourth fin 517 split the flow of fluid 60 into the first split flowpath 561, the second split flowpath 563, the third split flowpath 565, and the fourth split flowpath 567.

As explained above, the diameter of the downstream portion 355 of the inner bore 350 may be greater than the diameter of the upstream portion 351. Accordingly, after the fluid 60 flows from the upstream portion 351 of the inner bore 350 to the diverging portion 353 and the downstream portion 355 of the inner bore 350, the distance between the flow splitter body 501 and the inner surface 315 of the shaft body 310 (i.e., the outer perimeter of the inner bore 350) increases. Thus, as shown in FIG. 5C, as the fluid 60 passes through each of the first split flowpath 561, the second split flowpath 563, the third split flowpath 565, and the fourth split flowpath 567 within the downstream portion 355 of the inner bore 350, the centrifugal forces acting thereon forces the fluid to flow against the inner surface 315 of the shaft body 310 (i.e., the outer perimeter of the inner bore 350). The centrifugal forces of the rotating rotor shaft 300 may form a layer of the fluid on the inner surface 315 of the shaft body 310. As the fluid 60 reaches the downstream dam 521, the fluid 60 pools by the downstream dam 521 and pools at a location forward of the downstream dam 521. As the layer of the fluid is formed on the inner surface 315 of the shaft body 310, the pooling occurs as the layer of the fluid on the inner surface 315 of the shaft body 310.

As described herein, the inlets of the first shaft passages 340 are disposed at the second split flowpath 563 and the fourth split flowpath 567 forward po the downstream dam 521. Thus, as shown in FIGS. 5B and 5C, the fluid 60 pooling forward of the downstream dam 521 at the second split flowpath 563 and the fourth split flowpath 567 may flow into the first shaft passages 340 which, as explained above, flows into the first rotor core passages 220 and may exit from the front surface of the rotor core body 210.

On the other hand, as shown in FIGS. 5A and 5B, the fluid 60 pooling forward of the downstream dam 521 at the first split flowpath 561 and the third split flowpath 565 continues to pool until the depth of the pool from the inner surface 315 of the shaft body 310 (i.e., the perimeter of the inner bore 350) reaches the downstream opening 523 and flows rearward through the downstream opening 523. Additionally, if a flowrate of the fluid 60 entering the second split flowpath 563 and the fourth split flowpath 567 exceeds the flowrate of the fluid 60 exiting the second split flowpath 563 and the fourth split flowpath 567 through the first shaft passages 340, the fluid 60 pooling in the second split flowpath 563 and the fourth split flowpath 567 may also flow rearward through the downstream opening 523 once the pool of the fluid 60 reaches the downstream opening 523.

As shown in FIG. 5A, the fluid 60 flowing through the downstream opening 523 may flow to a rearward end of the inner bore 350 and form a pool forward of the downstream plug 430. The fluid 60 pooling forward of the downstream plug 430 flows out of the inner bore 350 through the second shaft passages 345. The fluid 60 then may flow through the second shaft passages 345 and the second rotor core passages 225 and exit from an outlet formed at the rearward surface of the rotor core body 210.

According to one or more embodiments, the second shaft passages 345 are axially aligned with the downstream opening 523 at the first and third split flowpaths 561, 565. Thus, the fluid 60 bypassing the first shaft passages 340 via the first and third split flowpaths 561, 565 and flowing through the downstream opening 523 may flow directly to the second shaft passages 345.

As described above, the fluid 60 for cooling the rotor core 200 and/or the rotor shaft 300 may enter the inner bore 350 within the rotor shaft 300 and be split as desired between the first shaft passages 340 which passes through the first rotor core passages 220 for cooling a forward portion of the rotor core 200 and the second shaft passages 345 which passes through the second rotor core passages 225 for cooling a rearward portion of the rotor core 200. This deterministic split may allow for more precise control of cooling of the rotor core 200 and/or the rotor shaft 300.

For example, the ratio of the flowrate of the fluid 60 fed to the first shaft passages 340 versus the flowrate of the fluid 60 fed to the second shaft passages 345 may be controlled by adjusting the positions of the first, second, third, and fourth fins 511, 513, 515, 517. For example, to increase this ratio, the positions of the first, second, third, and fourth fins 511, 513, 515, 517 may be adjusted to increase the widths of the second split flowpath 563 and the fourth split flowpath 567 which in turn decreases the widths of the first split flowpath 561 and the third split flowpath 565. To decrease this ratio, the positions of the first, second, third, and fourth fins 511, 513, 515, 517 may be adjusted to decrease the widths of the second split flowpath 563 and the fourth split flowpath 567 which in turn increases the widths of the first split flowpath 561 and the third split flowpath 565.

According to one or more embodiments, the first, second, third, and fourth fins 511, 513, 515, 517 are positioned such that the ratio of the flowrate of the fluid 60 fed to the first shaft passages 340 versus the flowrate of the fluid 60 fed to the second shaft passages 345 may be in a range of 10% to 20% to 30%, 30 to 40%, 40% to 50%, 50% to 60%, 60% to 70%, 70% to 80%, or 80%-90%.

Figure 6A:
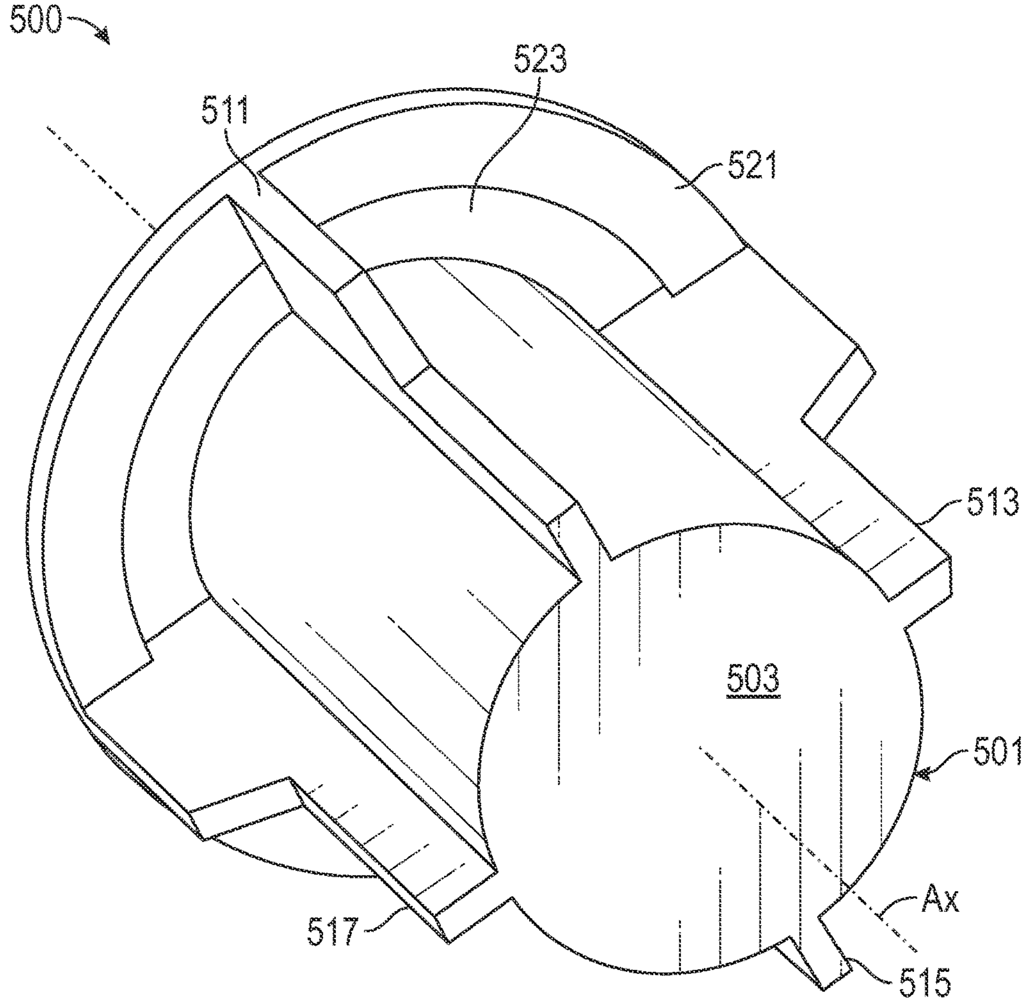
FIG. 6A is a perspective view of a flow splitter according to one or more embodiments.
Figure 6B:
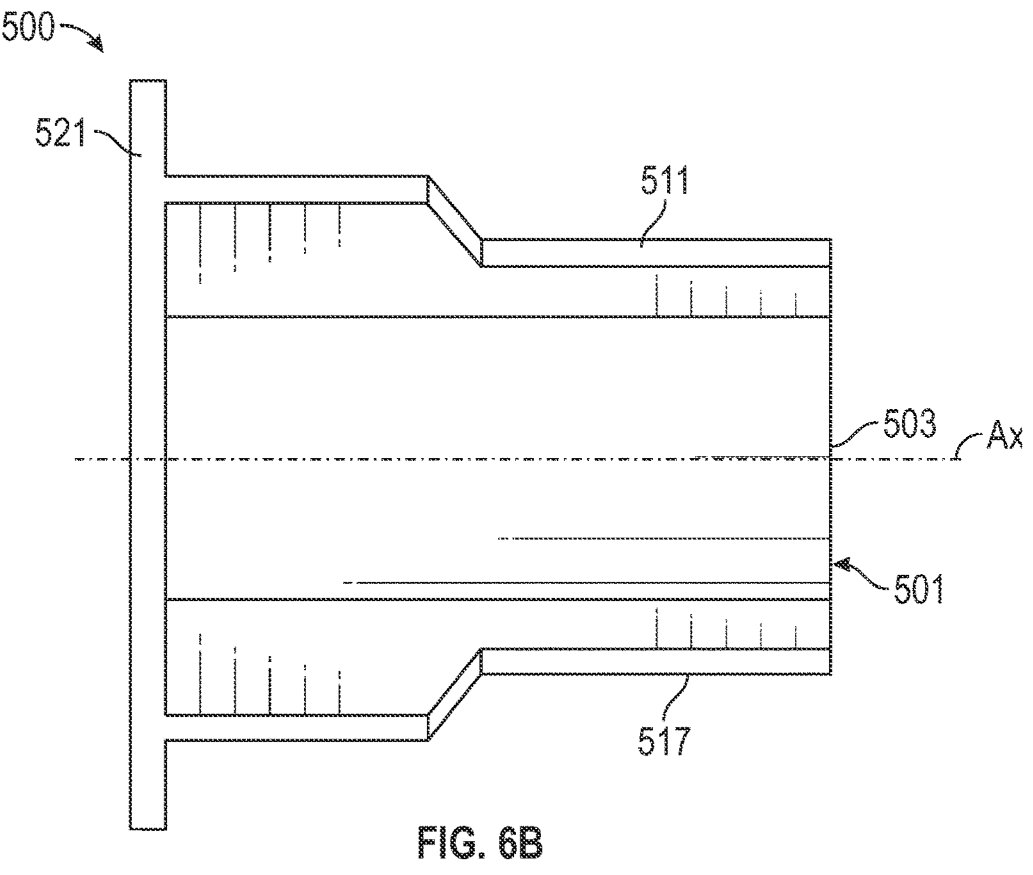
FIG. 6B is a radial view of a flow splitter according to one or more embodiments.
Figure 6C:
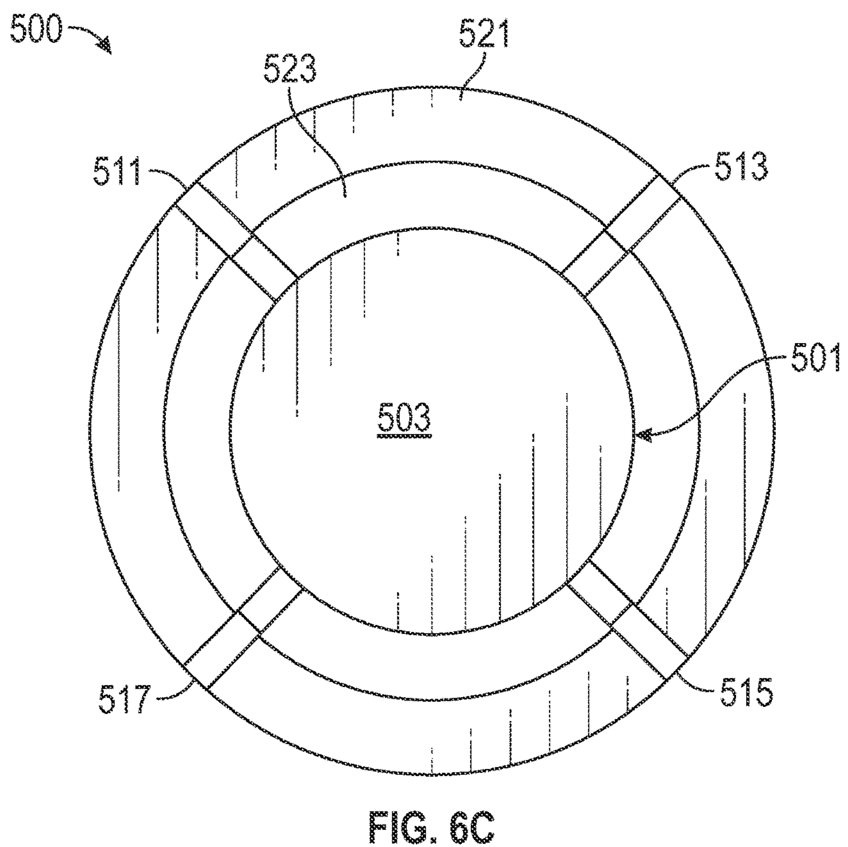
FIG. 6C is a front view of a flow splitter according to one or more embodiments.

FIGS. 6A-6C show a flow splitter 500 according to one or more embodiments. The flow splitter 500 shown in FIGS. 6A-6C is similar to that shown in FIGS. 4B and 5B except that the first, second, third, and fourth fins 511, 513, 515, 517 extend straight along the rotation axis Ax rather than obliquely with respect to the rotation axis Ax.

Figure 7A:
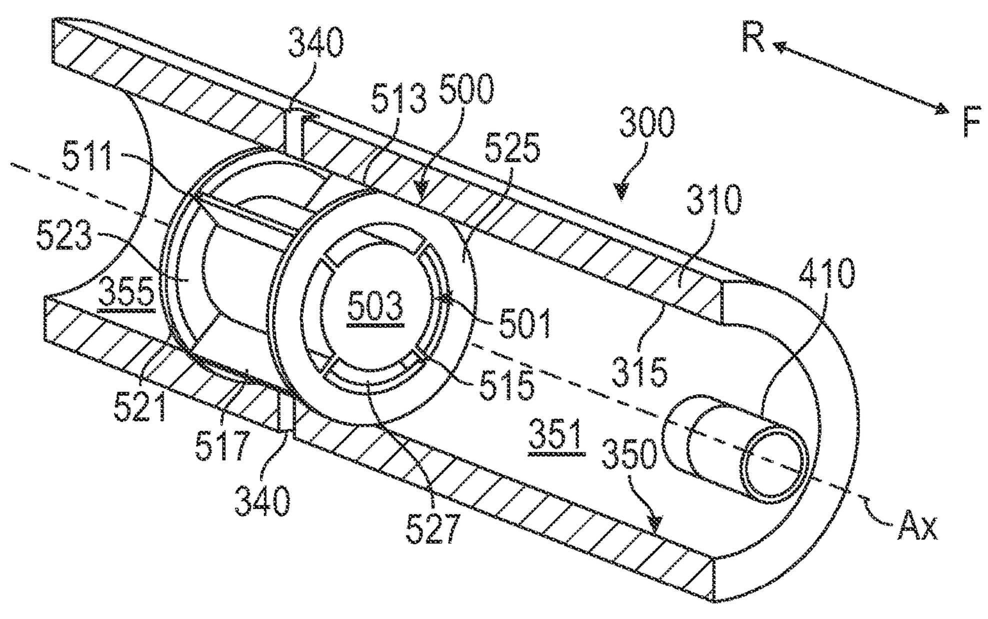
FIG. 7A is a perspective view of a rotor shaft with half of the rotor shaft removed to show a flow splitter and a snoot tube disposed therein according to one or more embodiments.
Figure 7B:
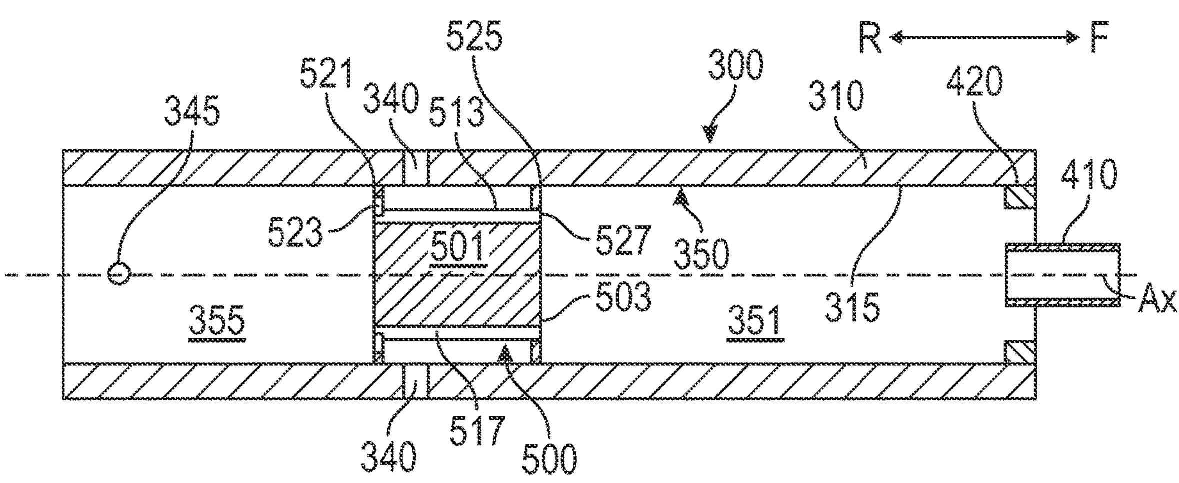
FIG. 7B is a cross-sectional view of a rotor shaft with a flow splitter and a snoot tube disposed therein according to one or more embodiments.

FIGS. 7A and 7B show a flow splitter 500 according to one or more embodiments disposed within an inner bore 350 having an upstream portion 351 and a downstream portion 355 with corresponding diameters. The flow splitter 500 shown in FIGS. 7A and 7B is similar to that shown in FIGS. 6A-6C except that the height of each of the first, second, third, and fourth fins 511, 513, 515, 517 are substantially constant to correspond to the constant diameter inner bore 350. Additionally, the flow splitter 500 in FIGS. 7A-7B includes an upstream dam 525 and an upstream opening 527. The upstream dam 525 and upstream opening 527 operate similarly to the downstream dam 521 and downstream opening 523, except the pooling of the fluid 60 occurs forward of the flow splitter 500. According to one or more embodiments, the upstream dam 525 has a greater dimension in the radial direction than the downstream dam 521.

Figure 8A:
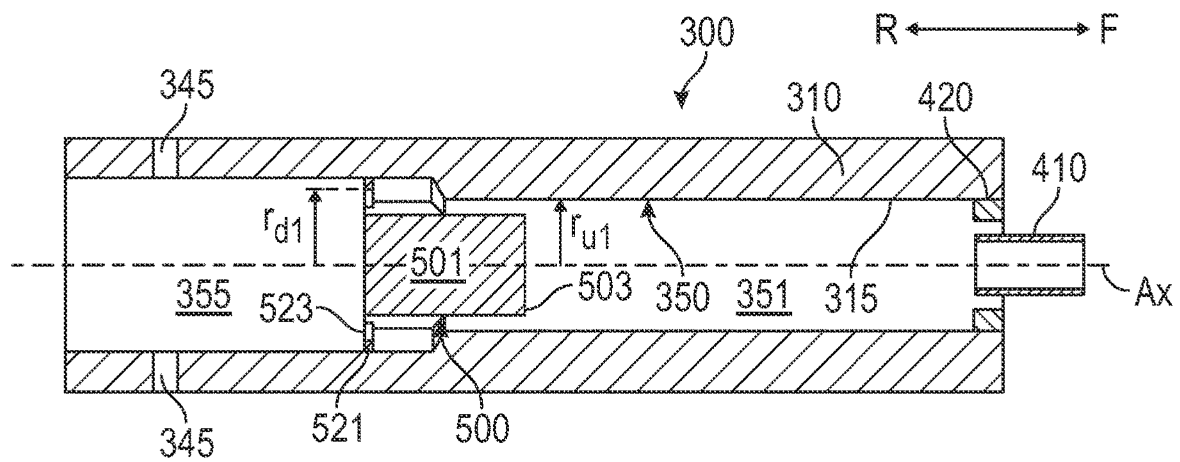
FIG. 8A is a cross-sectional view of a rotor shaft with a flow splitter and a snoot tube disposed therein according to one or more embodiments.

As shown in FIG. 8A, for an inner bore 350 having a downstream portion 355 with a diameter greater than the upstream portion 351, a distance between the rotation axis Ax and a radial inner end of the downstream dam 521 may be defined as a first downstream radius $r_{d1}$ and a distance between the rotation axis Ax and the inner surface 315 of the shaft body 310 (i.e., the perimeter of the inner bore 350 at the upstream portion 351) may be defined as first upstream radius $r_{u1}$. According to one or more embodiments, the first downstream radius $r_{d1}$ is set to be greater than the first upstream radius $r_{u1}$ to prevent backflow of the fluid 60 towards the forward end of the inner bore 350.

Figure 8B:
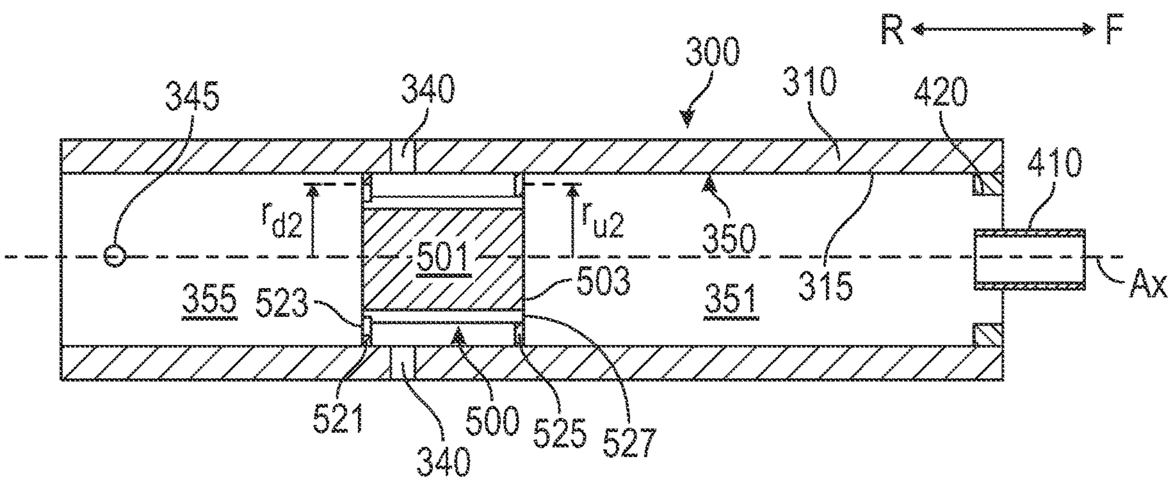
FIG. 8B is a cross-sectional view of a rotor shaft with a flow splitter and a snoot tube disposed therein according to one or more embodiments.

As shown in FIG. 8B, for an inner bore 350 having a downstream portion 355 with a diameter corresponding to the upstream portion 351, a distance between the rotation axis Ax and a radial inner end of the downstream dam 521 may be defined as a second downstream radius $r_{d2}$ and a distance between the rotation axis Ax and a radial inner end of the upstream dam 525 may be defined as a second downstream radius $r_{u2}$. According to one or more embodiments, the second downstream radius $r_{d2}$ is set to be greater than the second upstream radius $r_{u2}$ to prevent backflow of the fluid 60 towards the forward end of the inner bore 350.

According to one or more embodiments, the structures of the inner bore 350 and the flow splitter 500 may allow for a more balanced delivery of flow of the fluid 60 between the first shaft passages 340 and the second shaft passages 345. The flow splitter 500 is a relatively small component that may achieve the aforementioned more balanced delivery while adding minimal mass and/or taking up minimal space, while being relatively inexpensive to manufacture and/or install.

Additionally, the flow splitter 500 may allow the split of flow of the fluid 60 between the first shaft passages 340 and the second shaft passages 345 to be controlled by adjusting the positions, shapes, and/or dimensions of the first, second, third, and fourth fins 511, 513, 515, 517, the flow splitter body 501, the downstream dam 521, the downstream opening 523, the upstream dam 525, and/or the upstream opening 527.

The terms "a" and "an" do not denote a limitation of quantity, but rather denote the presence of at least one of the referenced item. The term "or" means "and/or" unless clearly indicated otherwise by context. Reference throughout the specification to "an aspect", means that a particular element (e.g., feature, structure, step, or characteristic) described in connection with the aspect is included in at least one aspect described herein, and may or may not be present in other aspects. In addition, it is to be understood that the described elements may be combined in any suitable manner in the various aspects.

When an element such as a layer, film, region, or substrate is referred to as being "on" another element, it can be directly on the other element or intervening elements may also be present. In contrast, when an element is referred to as being "directly on" another element, there are no intervening elements present.

Unless specified to the contrary herein, all test standards are the most recent standard in effect as of the filing date of this application, or, if priority is claimed, the filing date of the earliest priority application in which the test standard appears.

Unless defined otherwise, technical and scientific terms used herein have the same meaning as is commonly understood by one of skill in the art to which this disclosure belongs.

While the above disclosure has been described with reference to exemplary embodiments, it will be understood by those skilled in the art that various changes may be made and equivalents may be substituted for elements thereof without departing from its scope. In addition, many modifications may be made to adapt a particular situation or material to the teachings of the disclosure without departing from the essential scope thereof. Therefore, it is intended that the present disclosure not be limited to the particular embodiments disclosed, but will include all embodiments falling within the scope thereof.

What is claimed is:

1. A rotor shaft for an electric motor assembly of a vehicle, the rotor shaft defining a rotational axis and a forward direction and a rearward direction along the rotational axis and comprising:

a shaft body having an inner bore therethrough delimited by an inner surface of the shaft body;

a first shaft passage extending radially outward from the inner surface of the shaft body;

a second shaft passage positioned in the rearward direction of the first shaft passage and extending radially outward from the inner surface of the shaft body;

a fluid source fluidly coupled to the inner bore to feed fluid to the inner bore; and a flow splitter disposed in the inner bore forming a first split flowpath and a second split flowpath, wherein flow of the fluid from the fluid source is split by the flow splitter between the first split flowpath and the second split flowpath, wherein the fluid passing through the first split flowpath bypasses the first shaft passage and enters the second shaft passage, wherein at least a portion of the fluid passing through the second split flowpath enters the first shaft passage, wherein the flow splitter comprises an annular dam having a radial outer side contacting an entire perimeter of the inner bore, wherein the annular dam is positioned at a rearward end of the flow splitter, and wherein an opening is formed on a radial inner side of the annular dam through which a portion of the fluid abutting the annular dam is configured to pass.

2. The rotor shaft of claim 1, wherein the rotor shaft further comprises an additional first shaft passage and an additional second shaft passage, wherein the flow splitter further forms a third split flowpath and fourth split flowpath, wherein the fluid passing through the third split flowpath bypasses the first shaft passage and the additional first shaft passage and enters the additional second shaft passage, and wherein at least a portion of the fluid passing through the fourth split flowpath enters the additional first shaft passage.

3. The rotor shaft of claim 1, wherein the flow splitter comprises a plurality of fins that form the first split flowpath and the second split flowpath.

4. The rotor shaft of claim 3, wherein the fins are helical structures.

5. The rotor shaft of claim 3, wherein outer radial ends each of the fins abut the inner surface of the shaft body.

6. The rotor shaft of claim 3, wherein a downstream end of each of the plurality of fins is attached to the annular dam.

7. The rotor shaft of claim 1, wherein an inlet of the first shaft passage is disposed between forward and rearward ends of the flow splitter.

8. The rotor shaft of claim 1, wherein the second shaft passage is circumferentially offset from the first shaft passage.

9. The rotor shaft of claim 1, wherein the inner bore comprises an upstream portion and a downstream portion that is rearward of the upstream portion, wherein a diameter of the inner bore is greater at the downstream portion than at the upstream portion, and wherein the flow splitter extends through both the upstream portion and the downstream portion.

10. The rotor shaft of claim 1, wherein the inner bore has a constant diameter, wherein the flow splitter comprises a dam disposed on at least part of a perimeter of the inner bore, wherein the dam is positioned at a forward end of the flow splitter, and wherein an opening is formed on a radial inner side of the dam.

11. The rotor shaft of claim 1, wherein the fluid source is a snoot tube.

12. The rotor shaft of claim 1, wherein a plug is disposed on a forward end of the shaft body around the fluid source.

13. The rotor shaft of claim 1, wherein a plug is disposed on a rearward end of the shaft body.

14. A rotor assembly for an electric motor assembly of a vehicle defining a forward direction and a rearward direction, and comprising:

a rotor core comprising a rotor body defining a first rotor core passage and a second rotor core passage positioned in the rearward direction of the first rotor core passage; and a rotor shaft disposed at least partially within the rotor core and defining a rotational axis extending in the forward direction and rearward direction and comprising:

a shaft body having an inner bore therethrough delimited by an inner surface of the shaft body;

a first shaft passage extending radially outward from the inner surface of the shaft body, and the first shaft passage fluidly coupled to the first rotor core passage;

a second shaft passage positioned in the rearward direction of the first shaft passage and extending radially outward from the inner surface of the shaft body, the second shaft passage fluidly coupled to the second rotor core passage;

a fluid source fluidly coupled to the inner bore to feed fluid to the inner bore; and a flow splitter disposed in the inner bore forming a first split flowpath and a second split flowpath, wherein flow of the fluid from the fluid source is split by the flow splitter between the first split flowpath and the second split flowpath, wherein the fluid passing through the first split flowpath bypasses the first shaft passage and enters the second shaft passage, wherein at least a portion of the fluid passing through the second split flowpath enters the first shaft passage, wherein the flow splitter comprises an annular dam having a radial outer side contacting an entire perimeter of the inner bore, wherein the annular dam is positioned at a rearward end of the flow splitter, and wherein an opening is formed on a radial inner side of the annular dam through which a portion of the fluid abutting the annular dam is configured to pass.

15. The rotor assembly of claim 14, wherein the rotor shaft further comprises an additional first shaft passage and an additional second shaft passage, wherein the flow splitter further forms a third split flowpath and fourth split flowpath, wherein the fluid passing through the third split flowpath bypasses the first shaft passage and the additional first shaft passage and enters the additional second shaft passage, and wherein at least a portion of the fluid passing through the fourth split flowpath enters the additional first shaft passage.

16. The rotor assembly of claim 14, wherein the flow splitter comprises a plurality of fins that form the first split flowpath and the second split flowpath.

17. The rotor assembly of claim 16, wherein a downstream end of each of the plurality of fins is attached to the annular dam.

18. The rotor assembly of claim 14, wherein an inlet of the first shaft passage is disposed between forward and rearward ends of the flow splitter.

19. The rotor assembly of claim 14, wherein the inner bore has a constant diameter, wherein the flow splitter comprises an upstream dam disposed on at least part of a perimeter of the inner bore, wherein the dam is positioned at a forward end of the flow splitter, and wherein an upstream opening is formed on a radial inner side of the upstream dam.

20. A vehicle comprising:

an electric motor assembly comprising a rotor assembly, the rotor assembly comprising:

a rotor core comprising a rotor body defining a first rotor core passage and a second rotor core passage positioned in a rearward direction of the first rotor core passage; and a rotor shaft disposed at least partially within the rotor core and defining a rotational axis extending in a forward direction and rearward direction and comprising:

a shaft body having an inner bore therethrough delimited by an inner surface of the shaft body;

a first shaft passage extending radially outward from the inner surface of the shaft body, and the first shaft passage fluidly coupled to the first rotor core passage;

a second shaft passage positioned in the rearward direction of the first shaft passage and extending radially outward from the inner surface of the shaft body, the second shaft passage fluidly coupled to the second rotor core passage;

a fluid source fluidly coupled to the inner bore to feed fluid to the inner bore; and a flow splitter disposed in the inner bore forming a first split flowpath and a second split flowpath, wherein flow of the fluid from the fluid source is split by the flow splitter between the first split flowpath and the second split flowpath, wherein the fluid passing through the first split flowpath bypasses the first shaft passage and enters the second shaft passage, and wherein at least a portion of the fluid passing through the second split flowpath enters the first shaft passage, wherein the flow splitter comprises an annular dam having a radial outer side contacting an entire perimeter of the inner bore, wherein the annular dam is positioned at a rearward end of the flow splitter, and wherein an opening is formed on a radial inner side of the annular dam through which a portion of the fluid abutting the annular dam is configured to pass.

* * * * *